United States Patent [19]
Barrington et al.

[11] Patent Number: 5,394,540
[45] Date of Patent: Feb. 28, 1995

[54] SYSTEM FOR TESTING A NETWORK COMPONENT BY SELECTIVELY MODIFYING MESSAGES RECEIVED FROM THE COMPONENT AND RETURNING TO A SIMULATOR

[75] Inventors: Terrence K. Barrington, Naperville; Sandra L. Carrico, Lisle; Joseph W. Davison, Wheaton; Randolph W. Johnson, Lisle; Scott A. Mardis, Wheaton; Steven D. Raiman, Woodridge, all of Ill.

[73] Assignee: AT&T Corp., Murray Hill, N.J.

[21] Appl. No.: 123,571

[22] Filed: Sep. 16, 1993

Related U.S. Application Data

[63] Continuation of Ser. No. 941,473, Sep. 8, 1992, abandoned.

[51] Int. Cl.$^6$ ............................................. G06F 11/00
[52] U.S. Cl. .................. 395/500; 364/221.7; 364/221.2; 364/232.3; 364/DIG. 1; 371/15.1; 371/23
[58] Field of Search ............... 395/500, 200, 112, 113, 395/114, 575; 364/221.7, 232.3, 264.3, 550, 921.8, 928.4, 933.8, 578, 579, 200; 371/15.1, 18, 22.1, 22.5, 22.6, 23, 25.1

[56] References Cited

U.S. PATENT DOCUMENTS

| | | | |
|---|---|---|---|
| 3,927,371 | 12/1975 | Pomeranz et al. | 371/23 |
| 4,709,366 | 11/1987 | Scott et al. | 371/22.6 |
| 4,799,220 | 1/1989 | Nielsen | 371/25.1 |
| 5,012,180 | 4/1991 | Dalrymple et al. | 371/15.1 |
| 5,045,994 | 9/1991 | Belfer et al. | 364/200 |
| 5,051,938 | 9/1991 | Hyduke | 364/578 |
| 5,092,780 | 3/1992 | Vlach | 364/578 |
| 5,115,502 | 3/1992 | Tallman | 395/500 |
| 5,150,048 | 9/1992 | McAuliffe et al. | 371/15.1 |
| 5,177,440 | 1/1993 | Walker et al. | 371/25.1 |
| 5,189,365 | 2/1993 | Ikeda et al. | 371/23 |
| 5,195,095 | 3/1993 | Shah | 371/15.1 |

Primary Examiner—Thomas C. Lee
Assistant Examiner—Moustafa M. Meky
Attorney, Agent, or Firm—Michael B. Johannesen

[57] ABSTRACT

A system for testing one or more communication network components comprising a network entity simulator for emulating message communication among network entities and the one or more network components under test, and a message processor for intercepting predefined messages between the network entity simulator and the network components to examine, change, or delete intercepted messages. A scheduler arbitrates usage of processing among the components, and a language processor provides an interface for a tester to control the simulator and message processor.

10 Claims, 7 Drawing Sheets

SDL SPECIFICATION

FIG. 5
SCRIPT

```
1   filter test
2     on event install filter
3       put BIGMSG template into defaults;
4         :
5       put ASSREQ template into assign_req;
6       put HORQD template into horqd;
7       msl next;
8     end event
9     on event SIMmsg
10      if (MSGTYPE of rcvd_msg == MSGTYPE of assign_req)
11        then
12        print "Assignment message received"
13        populate defaults from rcvd_msg;
14        populate horqd from defaults;
15        put $3456 into CELLID of horqd;
16          :
17        sendmsg horqd to SUT;
18      endif
19      msl next;
20        :
21    end event
22      :
23  end filter
```

FIG. 6
ASSREQ TEMPLATE

| FSL FIELD NAMES IN BSSMAP MESSAGE ASSREQ ||||||
|---|---|---|---|---|---|
| MNEMONIC | DIR | FTYPE | FLEN | VRANGE | DEFVAL |
| MSGDISC | TO BSS | MF | 1 |  | 0 |
| MSGLEN | TO BSS | MF | 1 |  |  |
| MSGTYPE | TO BSS | MF | 1 | 0..255 | $01 |
| CHTYPE | TO BSS | MF | 3 |  | $000000 |
| L3HDR | TO BSS | MF | 2 |  | $0000 |
| PRI | TO BSS | OF | 1 | 0..255 |  |
| CIC | TO BSS | OF | 2 |  |  |
| RCHID | TO BSS | OV | 3..36 |  |  |
| DDTXF | TO BSS | OF | 1 | 0..255 |  |
| INTB | TO BSS | OF | 1 | 0..255 |  |

FIG. 7

HANDOFF REQUIRED TEMPLATE

| FSL FIELD NAMES IN BSSMAP MESSAGE HORQD | | | | | |
|---|---|---|---|---|---|
| MNEMONIC | DIR | FTYPE | FLEN | VRANGE | DEFVAL |
| MSGDISC | TO MSC | MF | 1 | | 0 |
| MSGLEN | TO MSC | MF | 1 | | |
| MSGTYPE | TO MSC | MF | 1 | 0..255 | $11 |
| MAPCAUSE | TO MSC | MV | 1..2 | | 0 LENGTH |
| RESREQ | TO MSC | OF | 0 | | |
| CELLIDS | TO MSC | OV | 1..253 | | |
| CRENV | TO MSC | OV | 5..253 | | |
| ENVBS | TO MSC | OV | 5..253 | | |

FIG. 8

BIGMSG TEMPLATE

| MNEMONIC | VALUE |
|---|---|
| CELLIDS | |
| CIC | |
| CHTYPE | $000000 |
| CRENV | |
| DDTXF | |
| ENVBS | |
| INTB | |
| L3HDR | $0000 |
| MSGDISC | $0 |
| MSGLEN | |
| MSGTYPE | |
| ⋮ | |
| RESREQ | |

FIG. 9
SCRIPT

```
1   filter delete
2     on event SUTmsg
3       if (MSGTYPE of Rcvd_msg == MSGTYPE of ASSCMP)
4       then
5         print "Assignment complete message"
6         :
7       endif
8       msl next;
9       :
10    end event
11    :
12  end filter
```

FIG. 10
SCRIPT

```
1   filter change
2     on event SUTmsg
3       if (MSGTYPE of Rcvd_msg == MSGTYPE of ASSCMP)
4       then
5         print "Assignment complete message"
6         put $0000 into CELLID of Rcvd_msg;
7         sendmsg rcvd_msg to SUT;
8         :
9       endif
10      msl next;
11      :
12    end event
13    :
14  end filter
```

SYSTEM FOR TESTING A NETWORK COMPONENT BY SELECTIVELY MODIFYING MESSAGES RECEIVED FROM THE COMPONENT AND RETURNING TO A SIMULATOR

This application is a continuation of application Ser. No. 07/941,473, filed on Sep. 8, 1992, now abandoned.

TECHNICAL FIELD

This invention relates to the field of communications networks, and, specifically, to the area of laboratory testing of individual components of the communications network.

BACKGROUND OF THE INVENTION

Thorough and careful testing of individual communications network components before they are installed in the telephone network is critical to maintaining the integrity of the network, especially when a new type of equipment is being installed for the first time. However, it is increasingly difficult to thoroughly test a single component of the network because, as networks become more complex, there is more interaction among the components of the communication network which has an effect on the component to be tested. As a result, it is very difficult to isolate one component from the rest of the network for testing of that component's functionality.

For example, thorough testing of a wireless mobile switching center ("MSC") requires testing of the interface between the MSC and the base station systems ("BSS"). The interaction of the MSC and BSS, in turn, is heavily influenced by the number and activity of mobile stations (MS) in contact with BSS. Preferably, a plurality of BSSs and MSs are needed for testing the full functionality of the MSC, because MSCs in the field work with several BSSs and many MSs, and MSC operations such as consol of handoffs of an MS from one BSS to another need to be tested. Using real BSSs and MSs in a laboratory is expensive, and, in the laboratory environment, it is difficult if not impossible to simulate many error conditions for testing the effectiveness of error handling capability of the system. Therefore, other methods are used to test MSCs.

Prior art testing systems provide either a system for testing messages between the MSC and other components (that is, testing the message interaction of the component under test with one other component) or a system for simulating a limited number of end-users of the component under test. In the message-based system, the tester must know every message that the component under test and the other components exchange, and then must be able to isolate one message for the purposes of examining, changing or deleting it. In the simulated end-user case, the tester must be able to emulate precisely every one of the component's operational conditions and potential error conditions in order to thoroughly test the component's full functionality.

Therefore, a problem in the art is that them is no system for testing network components that provides a system for isolating network components without the tester having to have detailed knowledge of all the interfaces, message exchanges, and error conditions.

SUMMARY OF THE INVENTION

This problem is solved by a system for testing one or more communication network components comprising a network entity simulator for emulating message communication among all relevant network entities and the one or more network components under test, and a message processor for intercepting predefined messages between the network entity simulator and the network components under test to examine, change, or delete intercepted messages. A scheduler arbitrates usage of processing among the components, and a language processor provides an interface for a test user to control the simulator and message processor.

A method in accordance with the invention provides for testing of a network component by receiving a first message from the network component at a message processor which determines if the message is of a predefined type. If it is, then the message processor examines the message. The message is then sent to a simulator. The simulator responds to the first message by sending a second message to the message processor. The message processor determines if the second message is of a predefined type. If it is, then the message processor examines the message. The message is then sent to the network component. Advantageously, when a message is examined, its contents may be displayed at a test user console, changed, or deleted.

An apparatus in accordance with the invention provides a system for testing a network component comprising a simulator, a message processor and a user console. The simulator simulates message communication which is responsive to the network component. The message processor intercepts messages between the network component and the simulator. The user console provides a manual interface to the simulator for control and to the message processor for examining the messages. Messages may thus be examined, changed or deleted.

A further method in accordance with the invention provides a system for testing a network component comprising a simulator, a message processor and a user interface, wherein the system communicates via messages. The system processes messages by providing a plurality of templates, each of which has a plurality of value fields. The system also provides a Big Message comprising the union of all unique value fields in the predefined messages. Advantageously, values may be stored from selected ones of the message templates in the Big Message, and other ones of the message templates may be populated from values stored in the Big Message.

BRIEF DESCRIPTION OF THE DRAWING

FIG. 5 is a sample message processor script for a message processor of the exemplary embodiment of FIG. 1;

FIG. 6 is a sample template for an assignment request template as used by the script of FIG. 5;

FIG. 7 is a sample template for a handoff request message as used by the script of FIG. 5;

FIG. 8 is a sample template for a "Big Message" as used by the script of FIG. 5;

FIG. 9 is a sample message processor script illustrating deletion of a message;

FIG. 10 is a sample message processor script illustrating changing a message.

DETAILED DESCRIPTION

Figure 1:
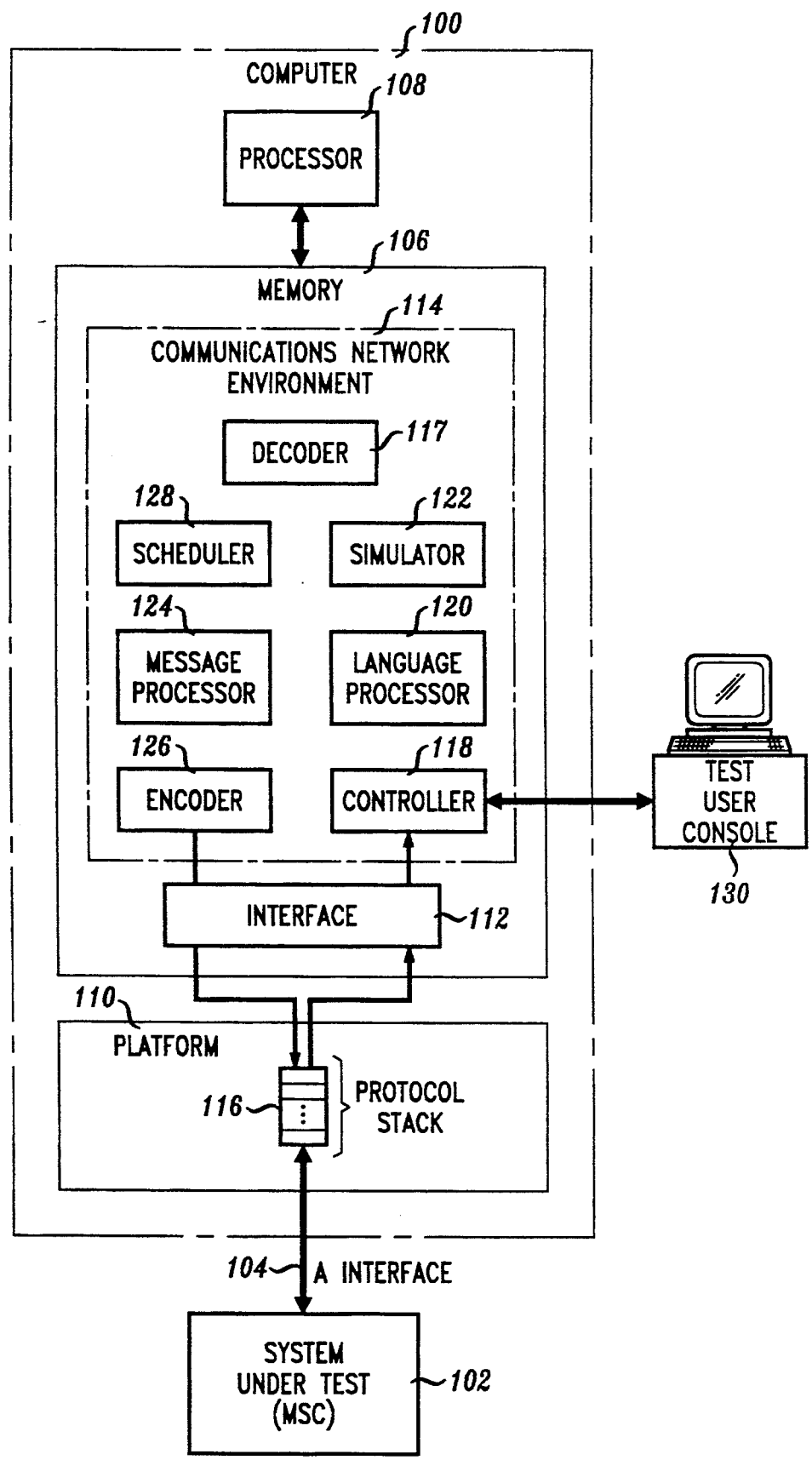
FIG. 1 is a block diagram illustrating a system under test connected to a computer system operating an exemplary embodiment of this invention.

Referring to FIG. 1, the system described herein is suitable for programs that run on a digital computer 100. Digital computer 100 is connected to a system under test (MSC) 102 via data link 104. In this exemplary embodiment, MSC 102 is a mobile switching center (MSC) and data link 104 is an A interface, as town in the art, but this invention is not limited to testing MSCs. Other network components, such as switching systems, network consol points, and the like, may be tested using the system and method of this invention without departing from the scope of this invention.

The steps for carrying out the tasks performed by computer 100 are stored as encoded instructions in a memory device 106; wherein the contents of memory device 106 are examined by a processor 108 which interprets them to carry out actions using its own internal machinery, devices, and functions. The collection of steps controlling processor 108 are commonly called a program. The program is divided into conceptual parts having functional relationships to each other called processes. Each process occupies a portion of memory 106 as it is run by the underlying operating system (not shown). In the preferred embodiment of this invention, the underlying operating system is the UNIX ® operating system, as available from Unix System Labs.

For clarity, only two main processes (112, and 114) are shown for operation on computer 100. In reality, there would be several more to control the house-keeping and other functions of computer 100. Platform 110 provides the hardware and software interface between digital link 104 and computer 100. Platform 110 includes a protocol stack 116 which translates messages from MSC 102, in the protocol used by MSC 102 by stripping off any protocol layers, and receiving messages for the MSC 102 and adding the protocol layers expected by MSC 102. In this exemplary embodiment protocol stack 116 receives messages from MSC 102 and strips the bottom three layers of the SS7 protocol to present the remaining layers (including the user message portion) in SCCP primitives, as is defined by the CCITT Blue Book, Volume VI, Fascicle VI.7, Specifications of Signaling System, No. 7, Recommendations Q.711–Q.716, ISBN 92-61-03531-0. In the preferred embodiment of this invention, platform 110 is a DCT-6000 as available from ISDN Technologies Corp. of Mountain View, Calif.

Protocol stack 116 delivers messages to and receives messages from interface process 112. Interface process 112 provides further translation of the message to primitives, as will be described further, below. Interface process 112 delivers messages to a communications network environment (CNE) process 114 according to the preferred embodiment of this invention.

CNE process 114 comprises a plurality of sub-processes, some of which include further sub-processes. In programming terms, CNE process 114 is a "large" process, comprising a plurality of "medium" processes, some of which comprise "small" processes. In the preferred embodiment of this invention, CNE process 114 comprises controller 118, decoder 117, language processor 120, simulator 122, message processor 124, encoder 126 and scheduler 128. Controller 118 is the entry point of the process, which initializes the other medium processes upon system initialization, as is known in the art. Controller 118 also receives incoming messages from interface process 112, and receives incoming requests from test user console 130. Decoder 117 receives messages from interface 112 via controller 118 and translates each message from primitives into a template. Language processor 120 receives incoming requests from console 130 through controller 118, translates the requests, and provides input to the simulator 122 and, message processor 124 as will be described further, below.

Figure 3:
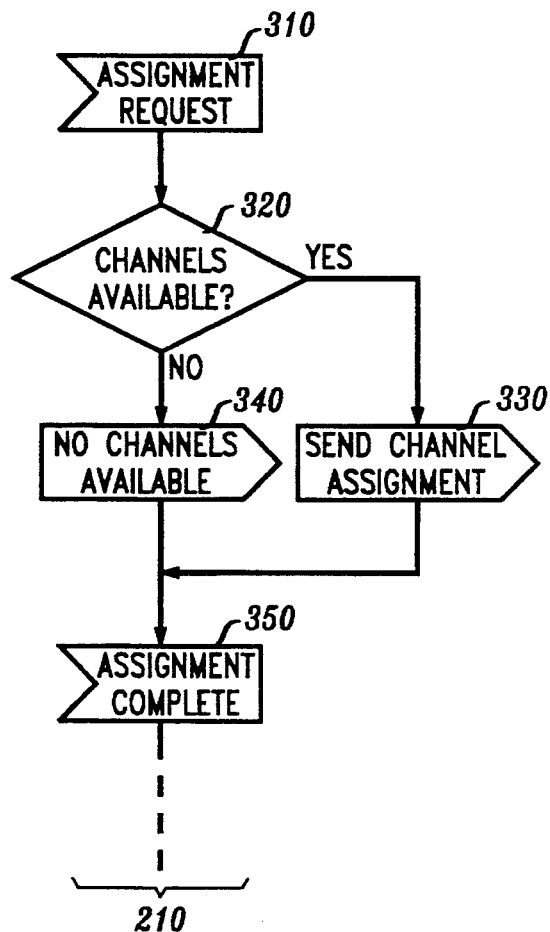
FIG. 3 is a diagram illustrating an example of an SDL specification as used by a simulator as shown in FIG. 4, to simulate BSS and MS interaction with the MSG.
Figure 4:
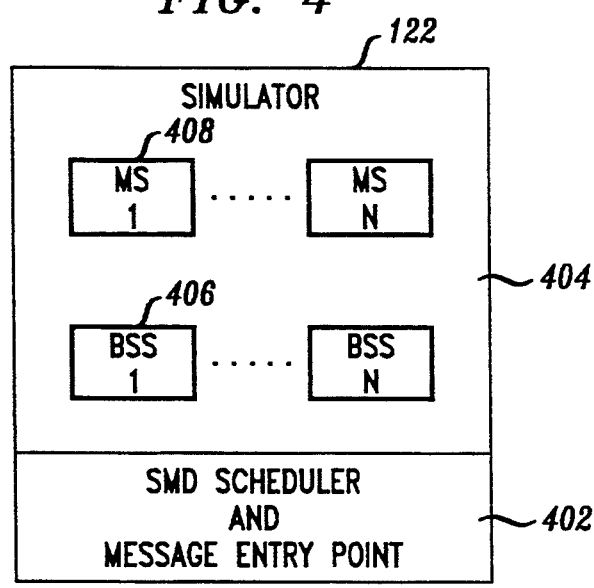
FIG. 4 is a block diagram of a simulator according to the exemplary embodiment of FIG. 1.

Simulator 122, as will be described in connection with FIGS. 3 and 4, provides simulation of network component(s) that interact with, or whose interactions affect the system under test. In the exemplary embodiment of this invention, simulator 122 simulates base station systems (BSSs) and mobile stations (MSs) that communicate with an MSC. Each network component process in simulator 122 is a small process comprising a state/event/response machine programmed according to the function being simulated. Simulator 122 is responsive to messages from MSC 102 to take appropriate action and change state, and responsive to user input from test user console 130 (via language processor 120) to change state and take appropriate action. Primarily, the action taken by the small processes in simulator 122 is to receive messages from MSC 102 and to send responsive messages back to MSC 102.

Message processor 124, as will be described further in connection with FIGS. 5, 9, and 10 below, intercepts all messages exchanged between MSC 102 and simulator 122, in order to determine if any of the messages are of interest to the tester and, if so, to manipulate the message in a predetermined way. Message processor 124 accepts input from the user via language processor 120 for intercepting predefined messages for examining response messages and changing, deleting, reporting to the test user and observing verification of handling of error conditions message before delivery. Message processor 124 then sends the intercepted messages to simulator 122 for messages from MSC 102 or to an encoder 126 for messages to MSC 102.

Encoder 126 receives messages from message processor 124 destined for MSC 102, formats the messages into the form expected by protocol stack 116, and sends them to protocol stack 116. Each of the medium processes has a message queue (described in connection with FIG. 11 ) which stores pointers to messages from other processes and notifies the scheduler that a process has work to do and needs to be run. Such messages may be from MSC 102, to MSC 102, or a request to take some internal action.

For purposes of illustrating the exemplary embodiment, a scenario of testing a mobile switching center (MSC) as the system under test is described in the context of FIG. 1. In mobile switching systems, the MSC must, for example, be able to accommodate a request to transfer ("handoff") a mobile station (MS) from one base station system (BSS) to another as the MS moves through the coverage area. Handoffs stimulate many exchanges of messages between the MSC and a plurality of BSS systems. Additionally, the MSC must be able to accommodate a handoff during all phases of call processing of the MS. Call setup is another time when there are a plurality of messages exchanged between the MS and the MSC. Therefore, testing of the MSC during a call setup which includes a handoff is critical to ensure that the MSC can handle the stress of real message traffic.

Note that testing the functionality of an MSC during call setup which includes a handoff is virtually impossible in a simulated end-user environment. It is difficult, if not impossible, to start a handoff manually between each and every message of call setup. Trying to guess when messages are received and then attempting to stimulate a handoff cannot be performed effectively. In the message exchanging test environment, the tester must preprogram the system to recognize all of the messages to be received front the MSC and all of the messages that the MSC expects to receive. Such preprogramming requires defining the messages to stimulate handoffs as well as the responses. If errors are to be induced in the messages, then both errors and the expected responses must also be preprogrammed. Such extensive preprogramming is very time consuming and requires a detailed knowledge of all of the fields and expected values in the messages exchanged between the MSC and the BSS during both call setup and handoff.

Figure 2:
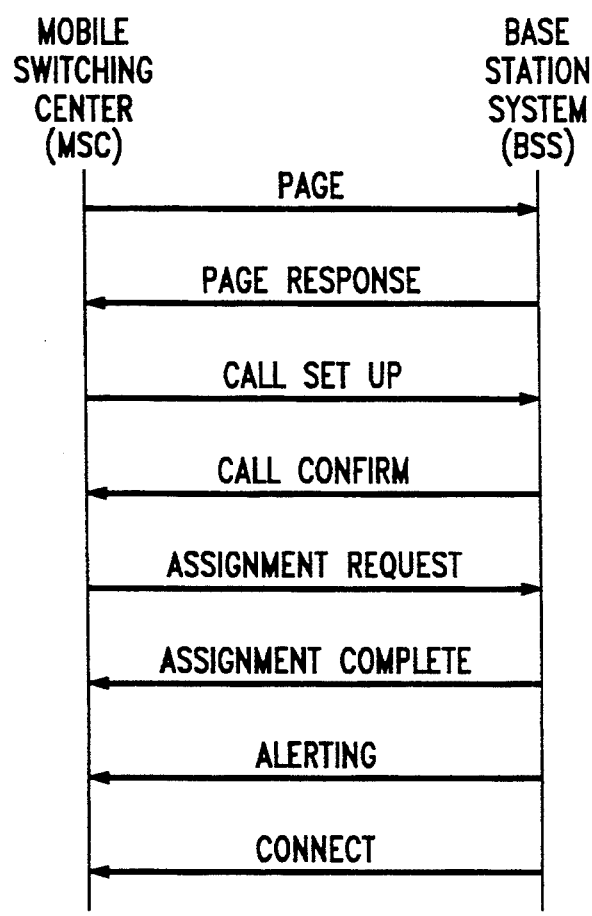
FIG. 2 is a message flow diagram of the messages exchanged between an MSC and a BSS during call setup.

FIG. 2 illustrates the message flow during a call setup where the MSC is completing a call to the MS. In general, a call to an MS is routed first to the MSC (not shown). The MSC sends a Page message to all BSSs to determine if the MS is active and which BSS is in communication with the MS. Next, the MS sends a Page Response via the BSS to the MSC, which causes location information in the MSC to be updated. The MSC then sends a Call Setup message to the MS via the BSS to initiate the call. The MS responds via the BSS with a Call Confirm message. The MSC sends an Assignment Request message to the BSS that the MS is in communication with. The BSS assigns a voice channel to the MS and informs the MS of the voice channel assignment (not shown). The MS responds with an Assignment Complete message which is sent by the BSS to the MSC. Next, the MSC sends an Alerting message which causes the MS to ring. The user of the MS presses a call appearance button, and the MS sends a Call Answered message (not shown and the BSS delivers the Connect message to the MSC.

In order to thoroughly test this mobile call processing scenario, a handoff request should be attempted after every one of the above-listed messages, to test the robustness of the MSC's message processing. In the exemplary embodiment of this invention, the tester enters a script at test user console 130 (FIG. 1) that specifies that on receipt of a message destined for the MSC, the system under test, or for the BSS (or destined for the MS), then send a handoff request message to the MSC. The tester can then observe the results or set up other scripts to observe the message flow. Certain of the message definitions must be known by the user (such as handoff request), but the user may find out this information by stimulating a handoff on the simulator and capturing messages stimulated by the request. By this very simple to use interface the functionality of the MSC may be tested.

Using this typical testing scenario, the advantages of the present invention can be illustrated. A person performing the testing of the MSC 102 (the "tester" or "user") initializes CNE process 114 by entering the appropriate UNIX commands as known in the art at test user console 130. The user then specifies the number of base station systems (BSS) and mobile stations (MS) to be simulated by simulator 122. This is accomplished by entering simple commands as will be discussed below. Next, the user activates one or more of the MSs by entering a command such as MS 1 ON at user console 130. This command causes simulator 122 to exchange a plurality of messages with MSC 102 as occurs when a real MS is turned on in a cellular system.

The user then stimulates MSC 102, through a telephone interface well known in the art and therefore not shown for clarity in FIG. 1, to set up a call to a simulated MS (MS1 in this example). MSC 102 and simulator 122 exchange a plurality of messages (as described above in FIG. 2). All messages between MSC 102 and simulator 122 are first routed through message processor 124. The user enters a script (compiled by language processor 120 into a filter), which examines all messages for a message of interest. A message of interest may be any one of the messages exchanged between MSC 102 and simulator 122; in the example described in FIG. 5, the message of interest is the Assignment Request message. When the message of interest is received, then message processor 124 sends a message to MSC 102 initiating a handoff. The user can then, by means as commonly used in the art, determine whether the MSC 102 successfully completed the call to the mobile station and the handoff at the same time. Thus, the user may test the functionality of MSC 102 (or any other network component) by simply and easily entering a few commands at test user console 130.

The cooperation of simulator 122 and message processor 124, according to this invention, provide the synergy facilitating the ease of testing that this invention provides to a user. A simulator 122, according to the preferred embodiment of this invention, provides the simulation of interaction among other network components, which, in this exemplary embodiment, is a simulation of base station systems (BSS) and mobile stations (MS). The requisite interaction of MSC 102, BSS and MS is specified in the specification for European Global Systems for Mobile Communications (GSM) 04.08, version 3.13.0, Mobile Radio Interface-Layer 3 Specification; and 08.08, version 3.10.1-Mobile Switching Center to Base Station System (BSS) Interface Layer 3, Feb. 10, 1990. The specification describes the interactions in Specification Description Language (SDL). SDL may be compiled by commercially available compilers into an interactive simulator, such as small processes in simulator 122.

Turning to FIG. 3, an SDL specification for a portion of call setup as used in the exemplary embodiment is shown. In this portion of the specification, call processing in the BSS is shown for call setup of an incoming call. A message is received from the MSC in box 310 stating that the BSS should assign a voice channel to an MS. In decision diamond 320, a test is made to determine whether a voice channel is available. If one is, then an assignment message is sent to the MS in box 330. If no channel is available, then a failure message is sent to the MSC in box 340. An assignment complete message is sent in box 350. This SDL sample, along with the rest of the BSS-MS specification, is compiled into a simulator 122 as illustrated in FIG. 4.

FIG. 4 illustrates a block diagram of a simulator after the SDL specification is compiled. In FIG. 4, simulator 122, a medium process in the large CNE process 114, is shown as comprising a scheduler/event and message entry point 402, and a plurality of small processes 404. In this exemplary embodiment of this invention, small processes 404 are processes representing each base station system (BSS) 406 and each mobile station (MS) 408 being simulated. Each small process 404 comprises a state/event/action table that can receive an event and the associated template and determine the action to be taken by performing a table look-up in the table. Each small process 404 is constructed to simulate actions taken by a network entity and send action or response messages to the system under test. Optimization may be used to strip out those actions that do not affect the message sending function. For example, messages that are only exchanged between the BSS and an MS may be removed, because they do not contribute to the testing of the MSC, the system under test. Simulator scheduler 402 receives events and their accompanying message template and routes the event to the proper small process 404. Scheduler 402 then schedules the receiving small process to run until the process sends a message to the system under test or otherwise stops.

In the call processing example of FIG. 2, message entry point 402 receives a message such as an Assignment Request message from MSC and delivers it to the destination BSS 406. BSS 406 performs a lookup in a state/event/table defining the normal response of a BSS and simulates the appropriate action. BSS 406, according to the exemplary embodiment of this invention, receives a message event and a template, updates its state table, and takes the action of sending an Assignment Complete message. BSS 406 informs MS 408 of a channel assignment, MS 408 acknowledges the assignment, and then BSS 406 sends the Assignment Complete message to MSC. The MS then sends an Alerting message to the MSC and an Alerting (ringing) signal to be given at MS 408.

When MS 408 is answered, scripts in message processor 124 are used to intercept the messages to and from the MSC. Scripts provide the basic functionality of message processor 124 in FIG. 1. Message processor 124 is a medium process within CNE 114. Message processor 124 includes an event entry point, which, in the preferred embodiment of this invention, recognizes events such as notification of the arrival of a message from the MSC, notification of the arrival of a message from the simulator, and control events. Message processor 124 comprises a virtual stack machine, which is well known in the art. The virtual stack machine operates on filters which are scripts compiled by language processor 120 and delivered to the message processor 124. A filter causes operations to be performed on a message in response to a message event.

In the example of FIG. 5, a script illustrates a filter for determining whether the assignment request message of the example has been received from the MSC. The filter is defined in line 1. In line 2, the filter checks for an event of the type "install filter." An "install filter" event is sent to the message processor from the test user console in order to initiate processing. Lines 3 through 7 define the processing used to initialize the filter. In line 3, the template "Big Message" (or "BIGMSG") is put into an instance labeled "defaults." "Big Message" is a template type (as will be described in connection with FIG. 8) that is used to store default values (and potentially other temporary values) as used by filters according to the preferred embodiment of this invention. In line 4, other initialization steps may be taken. In line 5, the template of the type "Assignment Request" (or "ASSREQ") is put into an instance labeled "assign_req." This step of line 5 provides a local copy of the assignment request message template. Line 6 provides a local copy of the "Handoff Request" template (HORQD) in "horqd." Line 7 allows the filter to receive the next message, and line 8 defines the end of the event.

Line 9 of filter test checks for receipt of an event of type "SIMmsg" or message from the simulator. In line 10, the filter tests the message type field of the receive message to determine if it is the same as the message type of the Assignment Request message. Line 11 is the "then" statement for the "if" of line 10. Line 12 prints out the message "Assignment message received" to the test user console 130. Line 13 moves all values from the received message into the default storage area. In line 14, the Handoff Request message is populated from defaults. This provides fields such as mobile ID, message length, and other data that was in the received message, for use by the handoff request message. In this manner, the programmer does not have to have detailed knowledge of all of the fields of the messages in order to test the interaction of the MSC and simulator. In line 15, a new cell number is put into the CELLID field of the Handoff Request message. Line 16 provides for other specifics that may be optionally added to the message. In line 17, the Handoff Request message is sent to the system under test (the MSC). Line 18 defines the end of the "if" statement of line 10. Line 19 permits the filter to receive the next message. Line 20 could be used, for example, to take other actions such as change a state in the filter, set a timer for receipt of a return message, etc. Line 21 is the end of the event that began on line 9. Line 22 indicates that other events (such as receipt of a SUT message or message to the system under test) may be added. Line 23 defines the end of the filter.

Turning now to FIGS. 6, 7, and 8, templates and their function are described. A template is representative of a message to or from the MSC 102 for use by CNE 114. FIG. 6 shows the template for the Assignment Request message. The first column of this template comprises a plurality of mnemonics representing fields of the message. Each mnemonic stands for a portion of the information in the message body (i.e., MSGLEN is message length; MSGTYPE is message type, etc.) For each field, there is an indication titled "DIR," of the direction of the message (either to the MSC, the MSC, or to the simulator). A field type titled "FTYPE" (mandatory, mandatory variable, optional fixed or optional variable), a field length titled "FLEN" (in bytes), a range for the variable titled "VRANGE," and a default value titled "DEFVAL" if such value is not specified by the script or filter. FIG. 7 shows the template for the Handoff Request message comprising a plurality of mnemonics, a direction, a field type, field length, a value range and a default, as in FIG. 6, above. The fields in the mnemonics define information fields used when the MSC sends a message to the BSS.

FIG. 8 illustrates a template of the type "Big Message" after it has been populated in line 13 of the script on FIG. 5. Big Message is the union of all message fields (shown as "mnemonic" in FIGS. 6 and 7) of all messages defined in communication between the MSC and the BSS. Big Message also includes a value field. When Big message is defined in the script of FIG. 5, there are no values in the Big Message template. The Received message, which is an "assignment request" message (FIG. 6), is then transferred by the command "populate" into the instance default, which assigns all values from the fields in assignment requests that were populated by the MSC into the corresponding values in the defaults instance. This provides information that can be used by other messages in this message stream in order to change, delete, or alter messages without having to know the detailed content of each message. For example, in the exemplary embodiment of this invention, "populate" copies all field values from one template into another where the field mnemonics are the same and the field value in the destination is empty. The script of. FIG. 5 illustrates the Handoff Request message template (FIG. 7) being populated from the values stored in defaults.

FIG. 9 illustrates a script as used in message processor 124 to delete a message. Deleting a message is sometimes desirable in testing a system in order to determine whether the system can gracefully recover from a lost message. The script to filter 9, line 1, defines the filter as being the filter "delete." Line 2 checks for the event "MSC message," or message from system under test, and line 3 determines if the message type is the same as an Assignment Complete message. Line 4 is "then" corresponding to the "if" of line 3. Line 5 prints the message "Assignment Complete message" at the test user console. In line 6, other actions may be taken. Line 7 is the end of the "if" statement from line 3. In line 8, the next message is retrieved for the message processor to process. Other actions may be taken in line 9, and line 10 defines the end of the event. Other actions may be taken in this filter, as indicated in line 11, and line 12 indicates the end of the filter. Note that in this script the message Assignment Complete was never sent to the system under test. In this manner, the Assignment Complete message (or any other message) may be easily deleted from the stream of messages of FIG. 2. Thus, the user only has to know the message type of the message to be deleted.

FIG. 10 illustrates a script that changes a field in a message. For example, a field in a message may be changed in order to test the system's ability to recover from a message that was garbled in the transmission. Line 1 defines the filter as the filter "change." In line 3, an "if" statement checks if the receive message is of type assignment complete (as in FIG. 9 above). In this instance, the fact that the Assignment Complete message was received is printed out in line 5, and then in line 6 the value in the CELLID field is overwritten with a garbage or nonsense value shown as "$0000." In line 7 the Received message is sent to the system under test. The filter then could perform other tests or assignments and then the filter ends in line 14. Other tests include examining messages to the simulator for the proper response to induced errors. Further tests may examine messages for resumption of the proper message stream after error correction. In this manner, a message may be changed in order to check the error recovery ability of the system under test in response to this subtle error. The user only has to know the message type and the field that is to be altered, instead of having to program the entire sequence of messages.

Figure 11:
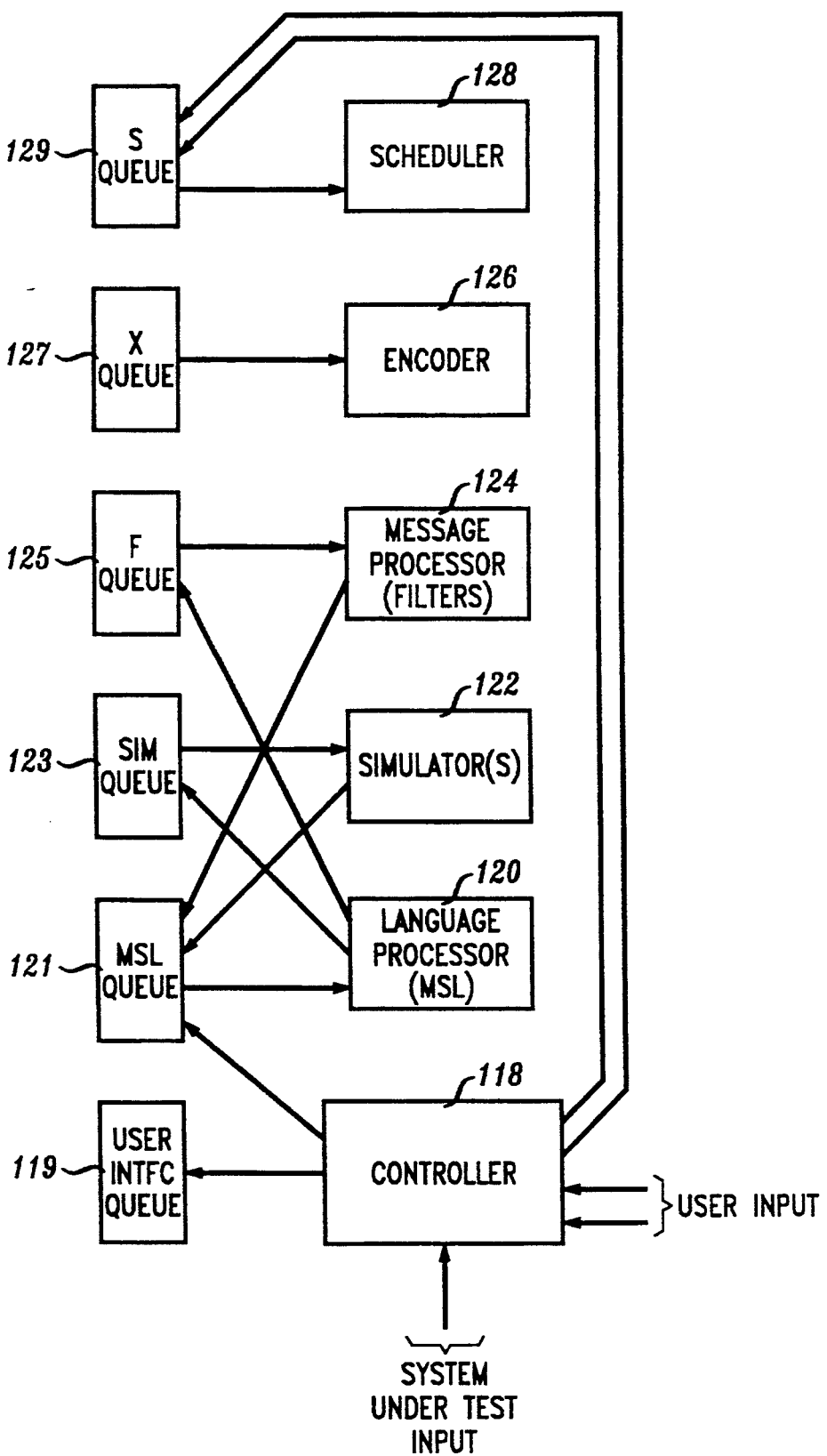
FIG. 11 is a diagram of the interaction of a language processor and the other processes according to the exemplary embodiment of FIG. 1.

Turning now to FIG. 11, a priority system according to the exemplary embodiment of this invention is shown. Scheduler 120 of the preferred embodiment of this invention operates on a straight priority scheme, according to descending order of Table 1.

TABLE I

1) Scheduler
2) Encoder
3) Message Processor
4) Simulator(s)
5) Language Processor The scheduler has the highest priority; the language processor has the lowest. For each medium process in CNE 114, there are input queues 119, 121,123, 125, 127, and 129. When a medium process communicates with another medium process, it sends an event to the other process which is placed on one of the input queues 119, 121,123, 125, 127, and 129.

Each input queue contains events and pointers to one or more templates for the medium processes to operate on. Scheduler 128 is run every time the CNE process receives a real-time segment from the operating system. Scheduler 128 is notified via its input queue 129 by controller 118 when an event is placed on input queues 119-129 of one of the medium processes. Scheduler 128 then checks the input queue of the medium processes and runs the highest priority process that has a message on the input queue. In this exemplary embodiment, all processes run to completion of the task, and will not be interrupted when a message is placed on a higher priority process queue.

Additionally, scheduler 128 includes a simple state table for determining whether language processor 120 can accept input. According to the exemplary embodiment of this invention, when user input arrives for language process 120, it is placed on one of two queues, depending on the state of language processor 120. If language processor 120 is idle (that is, not processing user input), the user input (in the form of a message) is placed on the input queue of language processor 120. If language processor 120 is busy, then scheduler 128 places the message on a holding queue until language processor 120 is idle. In this manner, language processor 120 does not flood simulator 122 with commands from the user interface. Both simulator 122 and message processor 124 are response time bound by the time it takes to exchange messages with the system under test, and cannot necessarily respond to language processor 120 in a timely fashion. Therefore, language processor 120 does not accept input until it receives an acknowledgement from simulator 122 or message processor 124. After simulator 122 or message processor 124 acknowledges language processor 120, then scheduler 128 transitions from the busy state to the idle state, and checks the holding queue for further work.

The relation between language processor 120 and the other medium processes is also shown in FIG. 11. Language processor 120 accepts user input from the test user console, translates the user input into commands or filters, and provides feed back to the user. Language processor 120 according to the preferred embodiment of this invention comprises two systems, one for messages to the simulator and one for filters.

In the context of the above-described testing scenario, the user or tester would enter the string "MS" at the user console and the input (represented by arrows) is received at controller 118. Controller 118 passes the input to MSL queue 121. Scheduler 128 detects an event on MSL queue 121 and causes language processor 120 to run. Language processor 120 parses the input, recognizes the input as being for the simulator, translates it into an event, and places the event on simulator queue 123. Scheduler 128 detects the event on simulator queue 123 and causes simulator 122 to run. Simulator 122 starts the message exchange with MSC 102, and optionally sends an acknowledgement event to the MSL queue 121, for the language processor to send to the user console.

The user or tester may enter scripts such as those of FIGS. 5, 9, or 10 at the test user console. In such cases, the input proceeds as above to language processor 120. Language processor 120 recognizes that the input is a script and compiles the script, as is known in the art. Language processor 120 then sends an event to filter (F) queue 125. Scheduler 128 causes message processor 124 to run and thereby recognize the filter. The user may then input a filter install command to activate the filter, which causes language processor 120 to send an event to F queue 125 to install the filter. The message processor may optionally acknowledge the install command by sending an event to the MSL queue, which the language processor then forwards to the test user console.

In this manner, a user may perform selective tests of the system under test. A user may track the progress of call setup through the system or may stimulate other actions. A user may change or delete a message in order to test the error handling capabilities of the system under test. Furthermore, the user does not have to preprogram or know every field of every message in order to test a system under test. It is to be understood that the above-described embodiment is merely illustrative principles of the invention and that many variations may be devised by those skilled in the art without departing from the scope of the invention. It is, therefore, intended that such variations be included within the scope of the claims.

I claim:

1. In a system for testing a communication network component, said test system comprising a simulator for simulating operational responses of elements of the network with which said network component is intended to interact and a message processor, said network component communicating with said test system by messages via said message processor, a method for testing said network component comprising:
   responsive to receipt of a first message from said network component by said message processor, said message processor determining whether said first message is a predefined type, and if said first message is said predefined type, manipulating said first message responsive to a user-changeable preprogrammed pattern;
   following said message processor sending said first message to said simulator, said simulator sending to said message processor a second message according to the operational responses of said network elements responsive to said first message;
   responsive to receipt of said second message, said message processor determining whether said second message is a predefined type, and if said second message is a predefined type, manipulating said second message responsive to a user changeable preprogrammed pattern; sending said manipulated second message to said network component; and
   said message processor monitoring further messages from said network component to determine whether said network component responds appropriately to said manipulated second message.

2. A method according to claim 1 wherein said manipulating includes changing a portion of said first and second message.

3. A method according to claim 1 wherein said manipulating includes deleting said second message.

4. A method according to claim 1 wherein said test system further includes a user interface for sending messages to said simulator from a test user, and wherein said simulator is responsive to receipt of a message from said test user for changing the configuration of said simulator.

5. A method according to claim 1 further comprising said message processor sending a third message to said network component to stimulate further messages.

6. In a system for testing a communication network component connected to a computer system, said network component and said computer system each being connected to a data link, said network component and said computer system communicating by messages on said data link, said computer system comprising a decoder, a simulator which simulates said communication network component's network environment, a message processor and an encoder, said decoder, simulator, message processor and encoder sharing a plurality of message templates and notifying each other to take action by sending events, a method for testing said communications network component comprising:
   responsive to receipt of a first message from said network component at said decoder, said decoder transforming said message into two portions, a first selected event and a first selected message template, said decoder filling in said selected message template responsive to said first message;
   following said decoder sending said first selected event to said message processor, said message processor examining said first selected message template;
   following said message processor sending said first selected event to said simulator, said simulator producing a response including a second selected event as a response event and a second selected message template as a response message template, said simulator filling in said responsive template according to a preprogrammed specification;
   following said simulator sending said response event to said message processor, said message processor examining said response message template to determine if it is a predefined template type; and
   following said message processor sending said response event to an encoder, said encoder transforming said response message template into a second message and sending said message to said network component when said response message template is said predefined template type.

7. A method according to claim 6 wherein said testing system further includes a user interface for sending ones of said plurality of events to said simulator from a test user, and wherein, responsive to a user selected event from said user interface, said simulator changes said programmed specification.

8. A method according to claim 6 wherein said examining includes changing said response message template.

9. A method according to claim 6 wherein said examining includes deleting said response message template.

10. A method according to claim 6 further including said message processor forwarding said response event to said encoder, responsive to said response message template type not matching said predefined template type.

* * * * *